US007561102B2

(12) United States Patent
Duvall

(10) Patent No.: US 7,561,102 B2
(45) Date of Patent: Jul. 14, 2009

(54) METHOD OF AND SYSTEM FOR EXPANDING LOCALIZED MISSING CUSTOMER-VEHICLE LAW ENFORCEMENT-AIDED VHF RECOVERY NETWORKS WITH LOCATION-ON-DEMAND SUPPLEMENTAL SERVICE FEATURES VIA SUCH NETWORKS FOR IMPROVED LAW ENFORCEMENT-AIDED RECOVERY, AND VIA THE INTERNET FOR PROVIDING SUPPLEMENTAL CUSTOMER SERVICE FEATURES

(75) Inventor: William Duvall, Sudbury, MA (US)

(73) Assignee: LoJack Operating Company, LP, Westwood, MA (US)

( * ) Notice: Subject to any disclaimer, the term of this patent is extended or adjusted under 35 U.S.C. 154(b) by 500 days.

(21) Appl. No.: 10/886,870

(22) Filed: Jul. 8, 2004

(65) Prior Publication Data

US 2006/0007039 A1    Jan. 12, 2006

(51) Int. Cl.
*G01S 5/14* (2006.01)
*B60R 25/10* (2006.01)
*G08B 1/08* (2006.01)

(52) U.S. Cl. .......................... 342/357.07; 342/357.08; 340/426.19; 340/539.13

(58) Field of Classification Search ............ 342/357.07, 342/357.08; 340/426.19, 539.13
See application file for complete search history.

(56) References Cited

U.S. PATENT DOCUMENTS

| 4,177,466 A | 12/1979 | Reagan |
| 4,818,988 A | 4/1989 | Cooperman et al. |
| 4,818,998 A | 4/1989 | Apsell et al. |
| 4,908,609 A | 3/1990 | Stroomer |
| 4,908,629 A * | 3/1990 | Apsell et al. ................ 342/457 |
| 5,554,993 A * | 9/1996 | Brickell ................. 342/357.07 |
| 5,673,305 A * | 9/1997 | Ross ..................... 342/357.07 |
| 5,704,008 A | 12/1997 | Duvall |
| 5,847,679 A * | 12/1998 | Yee et al. ............... 342/357.07 |
| 5,895,436 A | 4/1999 | Savoie et al. |
| 5,917,423 A | 6/1999 | Duvall |
| 6,211,818 B1 * | 4/2001 | Zach, Sr. ............... 342/357.07 |
| 6,229,988 B1 | 5/2001 | Stapefeld et al. |
| 6,249,252 B1 * | 6/2001 | Dupray .................. 342/357.01 |

(Continued)

FOREIGN PATENT DOCUMENTS

WO    WO 98/01769 A    1/1998

(Continued)

OTHER PUBLICATIONS

U.S. Appl. No. 10/241,259, Sep. 10, 2002, DeMille.

*Primary Examiner*—Thomas H Tarcza
*Assistant Examiner*—Fred H Mull
(74) *Attorney, Agent, or Firm*—Iandiorio Teska & Coleman

(57) ABSTRACT

A system and technique for improving the speed and ease of missing vehicle location and recovery by vehicle-carried transponder periodic coded replies to radio interrogation by a network of (VHF) transmitting towers, by integrating a concealed GPS location receiver with the transponder and providing the GPS-obtained coordinate information through the VHF network to enable a preliminary initial recovery location from which to home-in for recovery by subsequent direction-finding from the periodic transponder responses. Other location-on-demand services are also readily operable through the use of this VHF network, including providing said GPS coordinate or location information on the Internet.

8 Claims, 2 Drawing Sheets

U.S. PATENT DOCUMENTS

Figure 1:
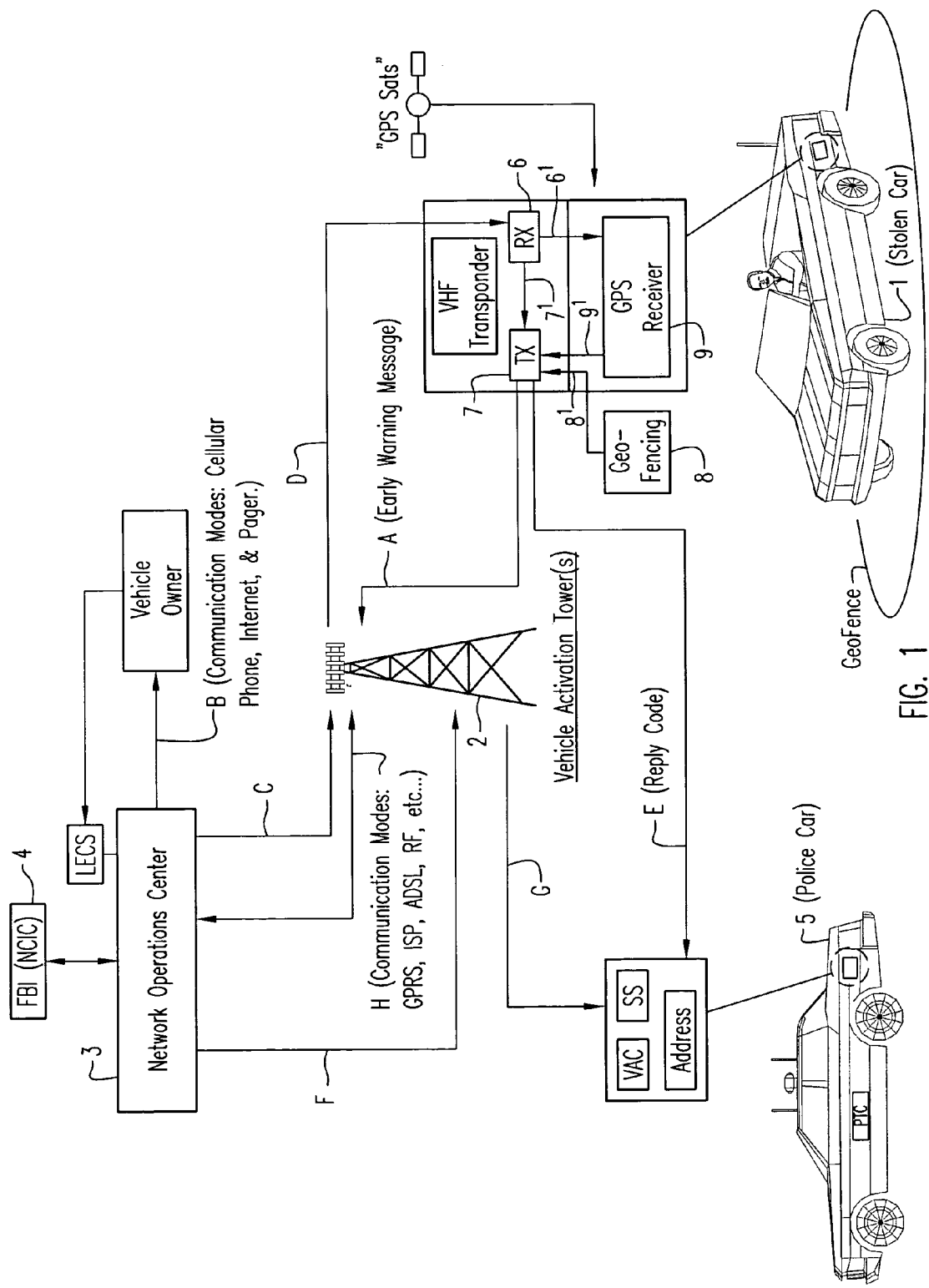

| | | | |
|---|---|---|---|
| 6,317,049 B1 * | 11/2001 | Toubia et al. | 340/573.4 |
| 6,522,698 B1 | 2/2003 | Irving et al. | |
| 6,665,613 B2 | 12/2003 | Duvall | |
| 6,735,630 B1 * | 5/2004 | Gelvin et al. | 709/224 |
| 6,847,825 B1 | 1/2005 | Duvall et al. | |
| 6,876,858 B1 * | 4/2005 | Duvall et al. | 455/456.1 |
| 2002/0005804 A1 | 1/2002 | Suprunov | |
| 2003/0060938 A1 * | 3/2003 | Duvall | 455/456 |
| 2003/0063000 A1 | 4/2003 | Grimm | |
| 2003/0151507 A1 * | 8/2003 | Andre et al. | 340/539.13 |
| 2004/0070515 A1 * | 4/2004 | Burkley et al. | 340/539.13 |
| 2004/0198309 A1 * | 10/2004 | Duvall | 455/456.1 |
| 2005/0215194 A1 * | 9/2005 | Boling et al. | 342/357.1 |
| 2006/0261981 A1 | 11/2006 | Romano et al. | |

FOREIGN PATENT DOCUMENTS

| | | |
|---|---|---|
| WO | WO 02/23922 A2 | 3/2002 |
| WO | WO 200223927 A * | 3/2002 |
| WO | WO03/015448 A2 | 2/2003 |
| WO | WO03/027786 A2 | 4/2003 |
| WO | WO03/097418 A1 | 11/2003 |

* cited by examiner

METHOD OF AND SYSTEM FOR EXPANDING LOCALIZED MISSING CUSTOMER-VEHICLE LAW ENFORCEMENT-AIDED VHF RECOVERY NETWORKS WITH LOCATION-ON-DEMAND SUPPLEMENTAL SERVICE FEATURES VIA SUCH NETWORKS FOR IMPROVED LAW ENFORCEMENT-AIDED RECOVERY, AND VIA THE INTERNET FOR PROVIDING SUPPLEMENTAL CUSTOMER SERVICE FEATURES

FIELD

The present invention relates to stolen or unauthorizedly moved ("missing") customer vehicle location and recovery systems, preferably of the type described in U.S. Pat. Nos. 4,818,998 and 4,908,629 of the common assignee herewith, the LoJack® Corporation, and in its 1989 brochure entitled "LoJack Stolen Vehicle Police Recovery Network", and to the problems not only of expanding the speed and ease of such recovery, but also to broadening the out-reach of the limited current localized VHF law enforcement-aided recovery network areas established therefor; the invention being more particularly further concerned with expansion of the capability to provide location-on-demand supplemental service features with the aid of GPS or other radio-navigation vehicle location information, both (1) to improve the law enforcement-aided recovery via such "LoJack" VHF networks, and (2) to provide customers via the Internet also with supplemental and even nation-wide service features such as customer "peace of mind" as to where the vehicle may currently be located; "roadside assistance" including for emergency conditions; and "early warning" as to vehicle removal, such as beyond established Geofencing, as examples of such supplemental service features—and all without the requirement for building out the limited localized VHF network areas into totally national VHF network coverage.

BACKGROUND

The prior and currently operating LoJack® or similar type missing vehicle location and recovery systems, as above mentioned, while highly successful in practice, have not heretofore been well-adapted to incorporate location information from GPS or other radio-navigation vehicle location systems (Loran-C, etc.) as a supplemental aid to the speed of the vehicle recovery, for reasons later detailed. Their utility, moreover, has been limited generally to the coverage of the VHF localized networks constructed for the system. These tracking VHF networks, as detailed in the said patents, cooperate with VHF transponders hidden in a customer's vehicle and responsive to commands or interrogation from the VHF broadcast antenna towers of the network, seeking periodic coded reply transmissions that can enable police and other law-enforcement vehicles to radio direction-find (RDF) by homing-in on the periodic vehicle-coded replies from the vehicle transponder.

In summary, current systems of this character generally operate as follows. When a vehicle equipped with such a transponder is lost, the owner reports that fact to the local police department which, in turn, reports to a central network computer station system for checking against a subscriber (FBI) list; and if a match is found, a computer message will be sent that includes a unique activation code and a unique reply code for the transponder of the stolen vehicle, and a description of the vehicle. This initiates the transmitting of the activation code from a series of VHF network radio broadcasting tower transmitting antennas, thereby causing the stolen vehicle transponder, if in the area or sector, to activate with a certain probability. The activation code is broadcast periodically until a report is received that the car has been retrieved by tracking police cars or until some predetermined time interval has been exceeded.

The frequency of the VHF network broadcast transmitters is the same as that of every vehicle transponder; namely, for example, a nationally assigned VHF law-enforcement frequency. But each unique transponder transmitter transmits a digital coded response or reply of say about a 10th of a second, periodically and preferably at pseudo random intervals, as from once every second to once every 10 seconds, roughly.

A police or other tracking vehicle, appropriately equipped with a direction-finding antenna system and a tracking receiver and display, when within the range of the missing vehicle, will display on an indicator panel the coded response received from the vehicle transponder; for example, a five-digit alphanumeric code corresponding to the code assigned to and transmitted by the vehicle transponder, as described in said patents. When the police officer sees that display, the officer calls into the radio dispatcher. If it turns out that this is a vehicle that has been stolen or that is otherwise desirable to track, the sector network broadcast transmitters will be activated to send out a different transmission distinguished from the first activation signals to the vehicle transponders that represent a request to increase the periodicity or rate of the vehicle transponder periodic responses or replies. The second, step-up or speed-up reply-request command signals for the same vehicle identification number, is provided in the command section of the message, causing the speed-up, as opposed to just turn-on, all as described in said patents.

When the vehicle transponder receiver receives this increased rate command signal, the transponder circuits will cause the transmission of the coded reply or response message signal from the transponder vehicle to be accelerated to a faster rate of transmission, say about once per second, so that those in the tracking vehicle, instead of seeing the coded number once every 10 seconds on the display, will see it once every second or so to aid in homing-in. The transponder will stay in that speeded-up mode for a period of time, say 30 minutes, and then automatically return to the regular mode of transmitting, say, once every 10 seconds; the expectation being that within a half-hour, the vehicle ought to have been recovered.

In more recent equipment, the accelerated mode is operated immediately, and then reverts to the "slow" mode after half an hour, after which a speed-up command can be broadcasted, as above described, to cause the unit to speed-up again (as for half an hour), etc. The initial accelerated mode, say once every second, is also particularly useful for the supplemental GPS location functions of the present invention, as later explained.

Further techniques have been developed by said assignee to enable the vehicle owner to get an early warning of the possible theft of the vehicle rather than by personally having to find a vehicle missing from the location where the owner parked it. Among these is remote sensing of unauthorized vehicle movement (U.S. Pat. No. 5,917,423) which may be noted by up-linking communication from the vehicle to the VHF tower networks, such as through the methodology of U.S. Pat. No. 6,522,698. Provision has also been suggested for using the owner's voice locally to arm and disarm a vehicle (U.S. Pat. No. 5,704,008) and for communicating panic or emergency alarms or "hotwiring" of the vehicle.

Battery power conservation during extended quiescence and for low current operation has also been provided (U.S. Pat. No. 6,665,613). The use of a single phone for location assistance, preferably making use of the existing cellular phone network also for data communication, is under development—(U.S. patent application Ser. Nos. 6,876,858 and U.S. patent application Ser. No. 09/622,278, filed Sep. 14, 2000, now U.S. Pat. No. 6,847,825). Supplemental national LoJack.RTM. type information coverage is anticipated when the basic VHF network system is used in conjunction with the cellular (GSM) network to achieve a measure of national coverage (U.S. patent application Ser. Nos. 10/150,818 and 10/241,259).

As earlier stated, however, while GPS has been widely used in vehicles, it has not heretofore lent itself to full integration with the VHF LoJack® type (or similar) vehicle theft recovery systems in which all transponder and radio communication modules must operate on a common much lower (VHF) frequency and must be miniaturized and randomly concealed and secreted in the vehicle, effectively undetectable by the would-be thief bent on disabling the same. The reasons for this are part physical and part economic. Clearly, the antenna exposure requirement of GPS receivers and the relatively high frequency and weak signal thereof, work against concealment from the would-be thief. Secondly, the added cost of separate GPS reception at the vehicle of GPS vehicle-coordinate information from the GPS navigation satellite constellation complex and then the provision for transmission of the same from the vehicle, have worked against the concept of very miniaturized low-cost vehicle recovery apparatus.

Underlying the present invention, however, is the discovery of how to integrate miniaturized GPS reception components within the miniaturized LoJack® type vehicle VHF transponder module to meet both of the limitations above-described, and simultaneously to provide a hybrid solution that can provide supplemental location-on-demand GPS information over the "highway" of the VHF network, not only to aid in the stolen vehicle function, but also to offer location-based services to the vehicle-owner customers by way also of the Internet. This has been aided, in part, by the recent technical developments in providing GPS integration with cell phones; but the invention has gone much further in adapting such for the somewhat different and more stringent random concealment requirements of vehicle-theft VHF transponder components and integrated GPS components, among other unique requirements. Such hybrid integration and specialized modification of concealable VHF transponders and GPS receivers integrated in novel fashion with the VHF transponder, furthermore, serendipitously uses the LoJack® or other VHF tracking network system in conjunction with cellular "GSM", for example, to achieve a measure of wider-even national-coverage. In the form, for example, of a basic LoJack® type VHF unit with a plug-in cellular module, the invention provides for various levels of coverage, as described, offering nationwide location-on-demand services without the requirement of having to build out national VHF network coverage. The architecture of the invention, furthermore, also provides a readily available interface for "telematics" companies that may wish to add the stolen vehicle recovery capability.

With a hybrid integrated approach of the invention, indeed, there may be provided all (or any combination) of a) early warning of unauthorized vehicle movement together with vehicle location and recovery; b) GPS assistance in the stolen vehicle recovery; c) vehicle Geofencing; d) emergency occasioned by door-unlocking or other tampering; and e) vehicle location-on-demand and related services.

Objects of Invention

A principal object of the invention, accordingly, is to provide a novel method of and system and apparatus for expanding the current localized VHF missing vehicle law-enforcement-assisted recovery networks with location-on-demand supplemental service features, including GPS information, via such VHF networks, for improved law-enforcement-aided recovery, and also, where desired, for added customer supplemental service features via the Internet.

A further object is to provide a novel VHF transponder-GPS receiver hybrid miniaturized apparatus with adaptability for concealed vehicle installation in vehicles and the like.

Other objects will be described hereinafter and are more fully delineated in the appended claims.

SUMMARY

In summary, however, from one of its important aspects, the invention embraces in a stolen or missing-vehicle location network for use with a vehicle-equipped VHF-frequency transmitter-receiver transponder assembly and comprising vehicle transponder-activating VHF antenna towers controlled from a network operations control center to instruct the transponder to transmit periodic vehicle-coded reply signals from the vehicle, usable by a VHF direction-finding vehicle to locate the missing vehicle, a method of providing supplemental GPS vehicle position information over the VHF network to the direction-finding vehicle, that comprises, integrating a GPS receiver within the vehicle VHF transponder assembly that, upon demand from the operations center, receives from the GPS satellite constellation on a GPS frequency, the GPS coordinate information of the missing vehicle at that time; providing said received GPS coordinate information to said VHF transponder transmitter to enable the same, upon demand, to transmit said coordinate information at said VHF frequency to said network, together with the vehicle code; and, under command of said network control operations control center, up-link transmitting said coordinate information from the missing vehicle VHF transponder transmitter to said network and thence to said tracking vehicle to provide a starting location for said direction-finding.

As for providing customer supplemental service features via the Internet, the invention also embraces in a vehicle location network of the type adapted for use with a vehicle-equipped VHF-frequency transmitter-receiver transponder assembly and comprising vehicle transponder-activating VHF antenna towers controlled from a network operations control center, a method of enabling also the use of said VHF network for providing vehicle owners with a variety of location-based services, that comprises, linking such owners by Internet communication with said network operations center; integrating a vehicle GPS receiver with said VHF transponder assembly such that, upon demand from the operations center, as relayed by the VHF antenna or towers to the vehicle, the GPS receiver receives on a GPS frequency from the GPS satellite constellation, the GPS coordinate information of the vehicle at that time; providing such information to the vehicle VHF transponder transmitter to enable the same to transmit said GPS coordinate information at said VHF frequency to said network towers together with the vehicle code and communicating said coordinate information to the network operations center; initiating said commands from the network operations center upon the Internet requests thereof by said vehicle owner for a location-based service; and providing said GPS coordinate information via the Internet as such a location service to the vehicle owner.

Preferred and best mode designs, apparatus and characteristics are later fully discussed.

DRAWINGS

Figure 2:
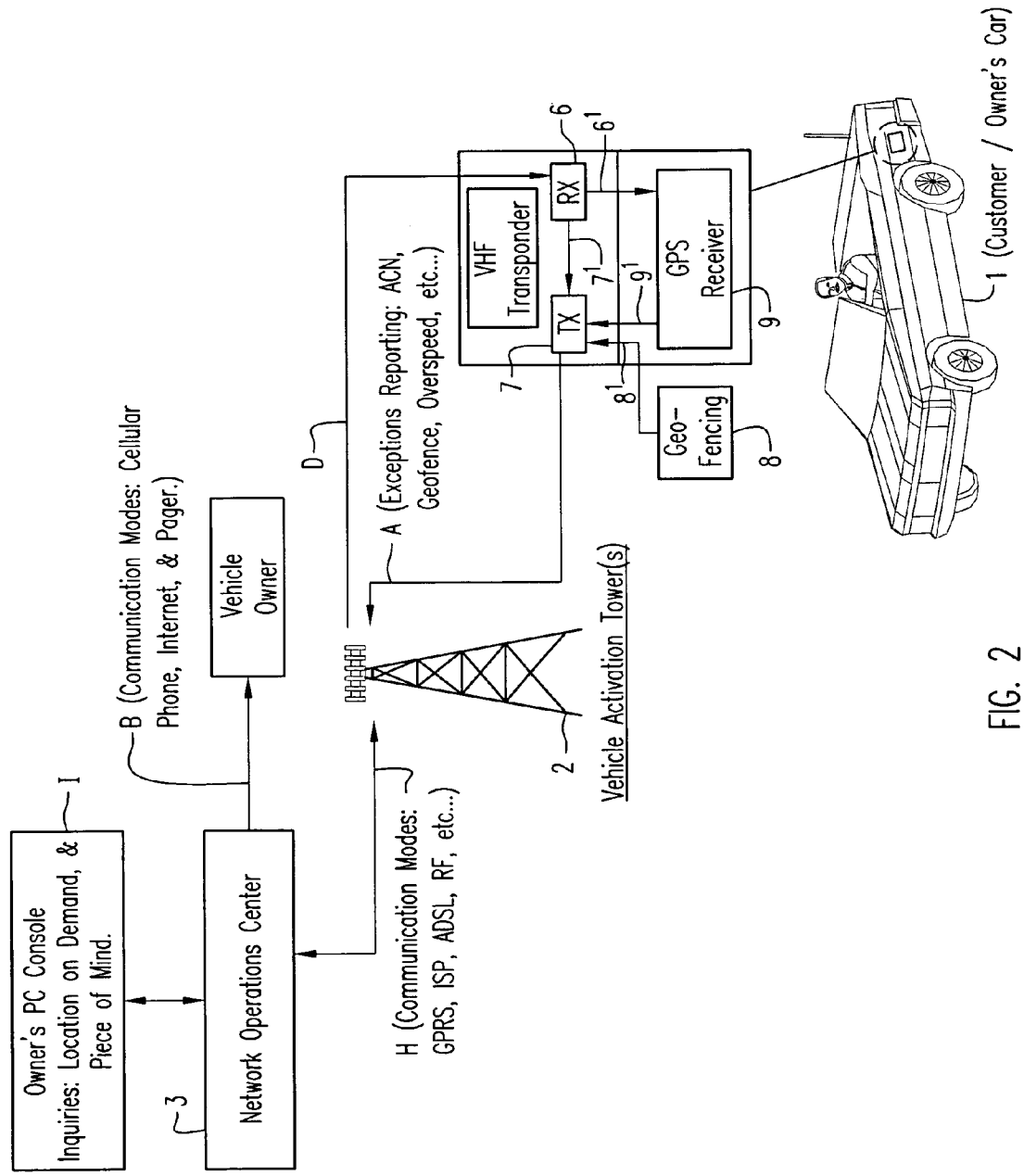

The invention will now be described with reference to the accompanying drawings, FIG. 1 of which is a system operational diagram in preferred form, illustrating the invention as applied to the stolen vehicle recovery functions; and FIG. 2 is a similar diagram illustrating more particularly the location-based services offered by the invention to vehicle customers, including the before-mentioned "location-on-demand" and "peace of mind" features, among others.

DESCRIPTION OF PREFERRED
EMBODIMENTS OF THE INVENTION

Referring to FIG. 1, the protected vehicle is shown at 1 containing the before-described customary "LoJack" or similar type randomly hidden embedded VHF miniaturized transponder comprising a receiver 6 and a transponder transmitter 7 (RX, TX). The transponder transmitter 7 will send periodic coded replies from the vehicle, as at E, to tracking police cars 5 in response to the receiving in the receiver 6 of activating commands from the VHF antenna network towers 2, once a vehicle owner has reported or confirmed the vehicle theft to the network operations control center 3, along B, as fully described in said U.S. Pat. Nos. 4,818,998 and 4,908,629.

In accordance with the example of FIG. 1, the vehicle VHF transponder has been supplemented with a Geofencing processor-sensor 8 as of the type described in the before-mentioned U.S. Pat. No. 6,665,613, which provides a signal for transmission by the transmitter 7, along an up-link path A to the antenna towers 2, for alerting the network operations center 3 that the vehicle has been moved out of its prescribed Geofencing area. Further, in accordance with the invention, as illustrated in FIG. 1, a miniaturized embedded GPS receiver 9 is also provided, as integrated on the transponder circuit board, for thereupon also transmitting by the VHF transponder transmitter 7, the GPS latitude-longitude coordinates of the vehicle at the time of the vehicle movement (theft), as received on the high GPS frequency from the satellite constellation "GPS Sats".

The concept is that when the vehicle has been moved without the authority of the owner, outside of the Geofencing area in the example of FIG. 1, as pre-established and stored within the vehicle VHF unit, an early warning message is sent back at A from the vehicle to the vehicle activation towers 2, and thence forwarded to the network operations center 3 as by any of a number of communication alternatives H, which may include cellular GPRS, or Internet via ISP, or by ADSL, or by microwave RF, or the like. This will enable a message to be sent at B from the control center to the owner of the vehicle, as over the owner's cell phone, or through the Internet or through a pager, to alert the owner that the vehicle has been moved. The owner, now knowing that it has been moved, then reports the theft of the vehicle, preferably after verifying that the car is missing. The owner then reports the theft of the vehicle to the police for entering into the law-enforcement computer network LECS. The law-enforcement computer system receives the report of theft, and as described in the above-cited patents, compares through the network operations center 3 with a stolen vehicle file which resides with the FBI, the national commercial information center NCIC, so labeled at 4. Upon confirmation of the vehicle being reported stolen, a message C is then transmitted from the network operations center 3 back to the towers 2, causing the towers to send a VHF command at D to the transponder receiver 6, not only to activate the vehicle VHF transponder transmitter 7 as indicated at $7^1$, but also to activate the integrated GPS receiver 9 at $6^1$ to receive GPS coordinates of the vehicle at that time from "GPS Sats" along the GPS frequency The GPS coordinate information thus received by the GPS receiver 9, will then be used ($9^1$) to modulate the transmitter 7 and be uplink-transmitted at the time of the tower activation of the transponder along the up-link path A to the tower 2, and thence by path H to the center 3, thus providing the center with the vehicle GPS coordinate location at that time together with the vehicle identification code of the VHF transponder transmitter 7.

Thus, through the detection of unauthorized movement of the vehicle by exceeding a pre-described Geofence, a warning is sent to the owner, the owner has reported to the police, the police have entered it, it has been determined through NCI as a stolen vehicle, and the network operations center 3 commands that a message be sent from the vehicle activation towers 2 to the stolen car at D, activating the VHF unit transponder 6-7 in the car, and causing the unit to transmit its before-described periodic reply code transmissions at E for reception by the vehicle direction-finding tracking vehicles 5, as fully described in the cited patents.

In accordance with an important feature of the present invention, however, because of the incorporation of the GPS receiver as above-described, the command center 3 may now also instruct the VHF towers at 2 to transmit the GPS coordinate information received from the VHF transponder transmitter 7, directly along G to the police cars 5 to get them started with the aid of the vehicle GPS location information at the time of the theft.

The invention thus implements the new result that, simultaneously with the tower activation D being sent to the stolen car transponder to trigger the response of the periodic reply code tracking signals, the network operations center 3 may also instruct the towers 2 at F to send the GPS location address directly along G to the police cars. So this command F to the towers 2 from the center 3 to send location information along G for display as a coordinate address for the police car, can provide a rough or coarse initial location where the stolen vehicle was moved. This then allows the police car to drive to that address indicated from the GPS location and it then permits the police tracking vehicle to receive at close range the tracking reply code E to make the accurate final recovery.

All of the above discussion has focused purely on the enhanced stolen vehicle recovery attributes which result from combining the GPS receiver with the VHF transponder. The uplink initial GPS location information may, indeed, even be provided before the owner has taken action to request police tracking.

The present invention, accordingly, uses the uplink VHF communication along A back from the stolen vehicle not just for early warning, as in response to movement or motion sensing, but also for supplemental precise vehicle-coded location information of at least the address where the vehicle moved out of its prescribed Geofencing area, thereby providing further early warning of unauthorized use—i.e. not only that the car has been moved, but exactly where it was at the time the thief took it. This now allows the police to send trackers directly to the initial location of the theft, rather than simply driving around randomly trying to direction-find for the vehicle. As before mentioned, this further allows the tracker in the police car to go to the area even though not yet having received the periodic coded transponder tracking signals; then using final radio direction-finding to make the final recovery, even though the car may by then have been driven to a garage or under a tree were GPS is not receivable.

The novelty of thus combining GPS with the tracking VHF network in the manner of the invention thus adds another layer of information for the police, giving them more precise control over where to send assets, and also requiring fewer numbers of tracking vehicles in the light of this knowledge of the precise location where the vehicle was initially moved—even without yet receiving the tracking signals at close range. By so combining the GPS receiver with the "LoJack" VHF transponder and VHF tracking network, the present invention moreover, can offer many other location-based-services, of which the before-described vehicle recovery is an important service.

Additional location-based-services that are also of value to customers include the before-mentioned and later-discussed notice of accidents, "peace of mind", etc. While the "Onstar" system offered by General Motors and other such systems provide many such services—they do so by using a cellular network and installing a cell phone in the car. The present invention can offer the same safety and security services, however, including for roadside assistance, medical emergency assistance, automatic crash notification, etc.—all without, however, requiring the use of cell phones or the cellular network with their attendant recurring fees. The use of the VHF tracking network of the invention, unlike the use of the cellular network, requires no recurring costs as in cellular operations, and provides these same services at lower cost and without requiring the incorporating of a cell phone modem in every unit sold. The combining of the existing VHF tracking-network with GPS in the novel integrated manner of the invention, and communicating position location information over the VHF network without requiring cellular phones, is thus a very powerful feature.

In FIG. 2, a system is outlined for the using of certain of the capabilities of the invention in integrating GPS with the VHF network vehicle tracking technology to offer services to the customers other than stolen vehicle recovery services. In this iteration, again the customer vehicle is equipped with the integrated VHF/GPS combination unit of FIG. 1, again miniaturized and randomly hidden in the car, but now used for other purposes—all enabled, however, by the uplink channel A and downlink or command or instruction channel D.

In this scenario, a number of services can be offered, some of which are based on the reporting of so-called "exceptions"—things that happen in the vehicle that are not called in by the owner of the vehicle. Among these, are automatic crash notification, as schematically illustrated at ACN as effected by sensing the deployment of the airbag in the vehicle. If the airbag in the vehicle is deployed and sensed, a transmission from the "LoJack" transponder transmitter 7 will be triggered and sent over uplink channel A without requiring any commands from tower 2,—for example, in the manner taught in the before-mentioned U.S. Pat. Nos. 5,917,423 and 6,522, 698. Because, however, the tower 2 is connected through the same communication links H of FIG. 1 (discussed as, for example, as GPRS for cellular or ISP for Internet, or even ADSL line, or RF, etc.) an uplink message containing this crash "exception" report can be reported through channel A back to the tower 2, and then from the tower to the network operations center 3, so that the network operations center may take some action in response to the exception report—in this instance, of a crash. The network operations center, by receiving precise location vehicle information from the GPS receiver 9 via the VHF transmitter 7, is now able to send emergency services to the car, such as an ambulance, fire truck or police, depending on the situation.

Similarly, if a violation of a Geofence was sensed, as before discussed, this may also be reflected as a transmission from the transponder transmitter 7 through channel A ultimately to the network operations center 3, causing the operations center, as through a link B (a phone or pager or Internet) to address the owner of the vehicle to confirm unauthorized use of the vehicle—another "exception" report.

Still another "exception" report is the before-mentioned overspeed—the car being driven too fast. The message may be sent from the vehicle's speed sensor by the transmitter 7 to the network towers 2, and from the towers to the operations center 3. A message may then be sent to the owner indicating that someone is driving the car carelessly, or over a predetermined speed. As still another example of such "exceptions", action can be taken by the owner of the vehicle just to make inquiries—primarily, "location on demand" requests. In such case, the owner, via the Internet from his or her PC console at I, can make an inquiry directly to the network operations center 3 over the Internet (indicated by arrowed interfacing) to query the location of the vehicle. Upon receiving such a query through the Internet, the network operations center 3 may instruct the tower network 2 through the channel labeled D, to command the GPS receiver to receive its coordinates. These are then transmitted by the transponder VHF transmitter 7 along L uplink path A to the network towers 2 and thence to the network operations center 3 so that the center may provide the street address of the vehicle through the Internet to the PC. This is called "location-one-demand" and/or "peace of mind", as when someone is missing.

In addition to "location-one-demand" and early warning of unauthorized use of the vehicle and overspeed, and the like, there are, of course, other possibilities which may be serviced—all having the important feature of the invention, however, that they don't require a cellular telephone to make these things happen, but, to the contrary, they use the existing network of the "LoJack" type VHF vehicle tracking network systems. Since cellular phones or any other means of communication are not required as in the prior art, the invention also eliminates the overhead and the recurring costs of a cell telephone number and the service from the cellular telephone company, thereby offering service costs that are dramatically lower to the consumer, for both the hardware and the service.

Further modifications will also occur to those skilled in this art and such are considered to fall within the spirit and scope of the invention as defined in the appended claims.

What is claimed:

1. In a stolen or missing-vehicle location network for use with a vehicle-equipped VHF-frequency transmitter-receiver transponder assembly and comprising vehicle transponder-activating VHF antenna towers controlled from a network operations control center to enable the transponder to transmit periodic vehicle-coded reply signals from the vehicle, usable by a VHF direction-finding vehicle to locate the missing vehicle, a method of providing supplemental GPS vehicle position information over the VHF network to the direction-finding vehicle, that comprises:

integrating a GPS receiver within the vehicle VHF transponder assembly such that, upon demand from the operations center, the GPS receiver receives from the GPS satellite constellation on a GPS frequency, the GPS coordinate information of the missing vehicle at that time;

providing said received GPS coordinate information to said VHF transponder transmitter to enable the same, upon demand initiated in response to the sensed departure of the vehicle from a pre-set geofencing area established therefore, to transmit said coordinate information at said VHF frequency to said network, together with the vehicle code; and, under command of said network control operations control center, up-link-transmitting said coordinate information from the vehicle VHF transmitter to said VHF antenna towers and thence to said tracking vehicle to provide a starting location for said direction-finding.

2. In a stolen or missing-vehicle location network for use with a vehicle-equipped VHF-frequency transmitter-receiver transponder assembly and comprising vehicle transponder-activating VHF antenna towers controlled from a network operations control center to enable the transponder to transmit periodic vehicle-coded reply signals from the vehicle, usable by a VHF direction-finding vehicle to locate the missing vehicle, a method of providing supplemental GPS vehicle position information over the VHF network to the direction-finding vehicle, that comprises:

integrating a GPS receiver within the vehicle VHF transponder assembly such that, upon demand from the operations center, the GPS receiver receives from the GPS satellite constellation on a GPS frequency, the GPS coordinate information of the missing vehicle at that time;

providing said received GPS coordinate information to said VHF transponder transmitter to enable the same, upon demand initiated in response to the network operations control center confirming the theft or other unauthorized movement of a vehicle, to transmit said coordinate information at said VHF frequency to said network, together with the vehicle code; and, under command of said network control operations control center, up-link-transmitting said coordinate information from the vehicle VHF transmitter to said network VHF antenna towers and thence to said tracking vehicle to provide a starting location for said direction-finding.

3. In a stolen or missing-vehicle location network for use with a vehicle-equipped VHF-frequency transmitter-receiver transponder assembly and comprising vehicle transponder-activating VHF antenna towers controlled from a network operations control center to enable the transponder to transmit from the vehicle, periodic vehicle-coded reply signals usable by a VHF direction-finding vehicle to locate the missing vehicle, apparatus for providing supplemental GPS vehicle position information over the VHF network to the direction-finding vehicle, that comprises:

a GPS receiver integrated with the vehicle transponder assembly and that, upon command from the operations center initiated in response to the sensed departure of the vehicle from a pre-set geofencing area established therefore, receives from the GPS satellite constellation on a GPS frequency, the GPS coordinate information of the missing vehicle at that time;

means for providing said received GPS coordinate information to said VHF transponder transmitter to enable the same, upon command, to transmit said coordinate information at said VHF frequency to said network, together with the vehicle code; and, means operable under the command of said network operations control center, for up-link transmitting said coordinate information from the missing vehicle VHF transmitter to said network towers and thence to said tracking vehicle to provide a starting location for said direction-finding.

4. In a stolen or missing-vehicle location network for use with a vehicle-equipped VHF-frequency transmitter-receiver transponder assembly and comprising vehicle transponder-activating VHF antenna towers controlled from a network operations control center to enable the transponder to transmit from the vehicle, periodic vehicle-coded reply signals usable by a VHF direction-finding vehicle to locate the missing vehicle, apparatus for providing supplemental GPS vehicle position information over the VHF network to the direction-finding vehicle, that comprises:

a GPS receiver integrated with the vehicle transponder assembly and that, upon command from the operations center initiated in response to the network operations control center confirming the theft or other unauthorized movement of the vehicle, receives from the GPS satellite constellation on a GPS frequency, the GPS coordinate information of the missing vehicle at that time;

means for providing said received GPS coordinate information to said VHF transponder transmitter to enable the same, upon command, to transmit said coordinate information at said VHF frequency to said network, together with the vehicle code; and, means operable under the command of said network operations control center, for up-link transmitting said coordinate information from the missing vehicle VHF transmitter to said network towers and thence to said tracking vehicle to provide a starting location for said direction-finding.

5. A stolen vehicle locating system comprising:

a VHF frequency transponder, a VHF frequency receiver, and a GPS receiver hidden within a vehicle;

a network of VHF antenna towers for transmitting a command to the transponder via the receiver to activate the transponder to transmit a coded signal; and a VHF direction finding unit responsive to the coded transponder signal for locating the vehicle and including a receiver for receiving vehicle GPS position data from the GPS receiver via the network of VHF antenna towers to also locate the vehicle.

6. A stolen article location system comprising:

a VHF frequency transponder, a VHF frequency receiver, and a GPS receiver associated with the article;

a network of VHF antenna towers for transmitting a command to the transponder via the receiver to activate the transponder to transmit a coded signal; and a VHF direction finding unit responsive to the coded transponder signal for locating the article and including a receiver for receiving article GPS position data from the GPS receiver via the network of VHF antenna towers to also locate the article.

7. A stolen vehicle locating method comprising:

hiding within a vehicle a VHF frequency transponder, a VHF frequency receiver and a GPS receiver;

transmitting, via a network of VHF antenna towers, a command to the transponder via the receiver to activate the transponder to transmit a coded signal; and locating the vehicle using a VHF direction finding unit responsive to the coded transponder signal and receiving vehicle GPS position data via the network of VHF antenna towers for also locating the vehicle.

8. A stolen article locating method comprising:

associating with an article a VHF frequency transponder, a VHF frequency receiver, and a GPS receiver;

transmitting, via a network of VHF antenna towers, a command to the transponder via the receiver to activate the transponder to transmit a coded signal; and locating the article by detecting the coded transponder signal and receiving article GPS position data via the network of VHF antenna towers.

* * * * *